(No Model.) 2 Sheets—Sheet 1.
W. MACNAB, Sr., & W. MACNAB, Jr.
APPARATUS FOR SEPARATING BY SUBSIDENCE SOLID MATTERS FROM LIQUIDS, &c.
No. 367,308. Patented July 26, 1887.
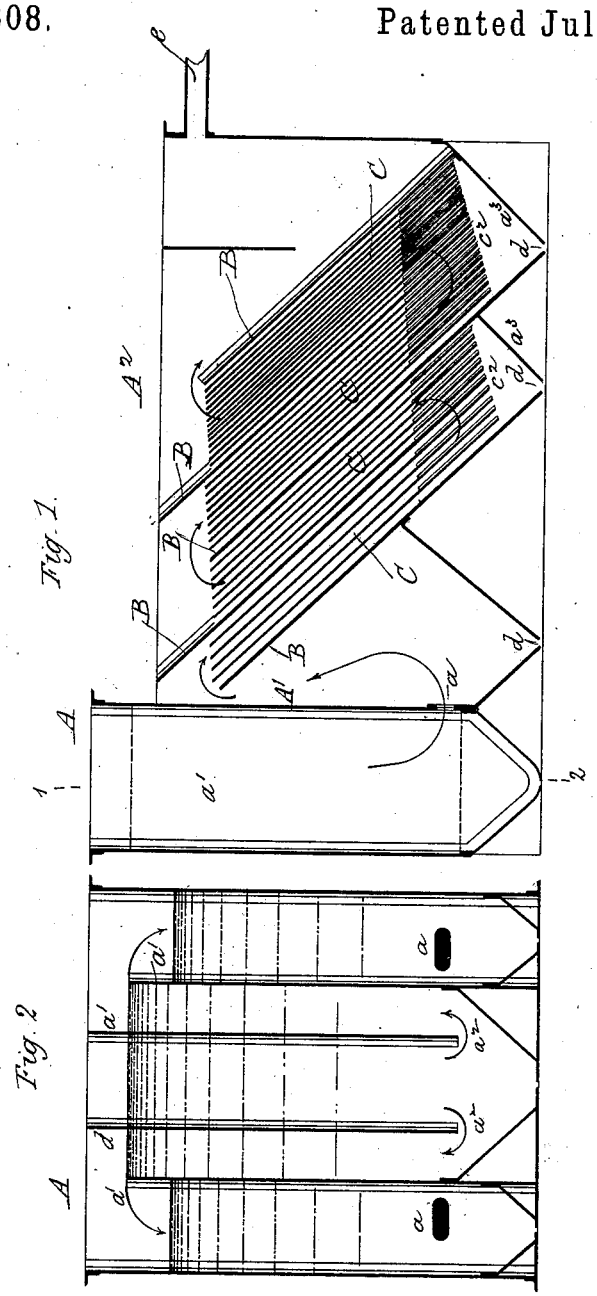

(No Model.) 2 Sheets—Sheet 2.
W. MACNAB, Sr., & W. MACNAB, Jr.
APPARATUS FOR SEPARATING BY SUBSIDENCE SOLID MATTERS FROM LIQUIDS, &c.
No. 367,308. Patented July 26, 1887.
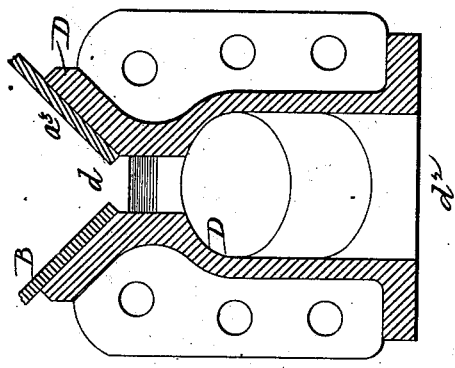
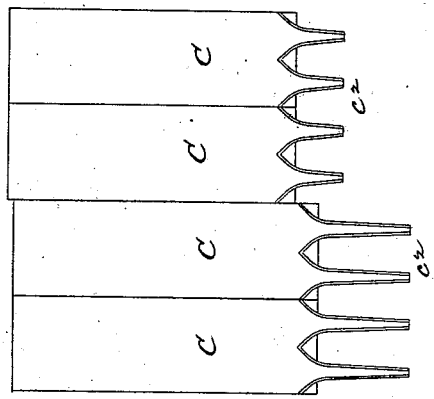
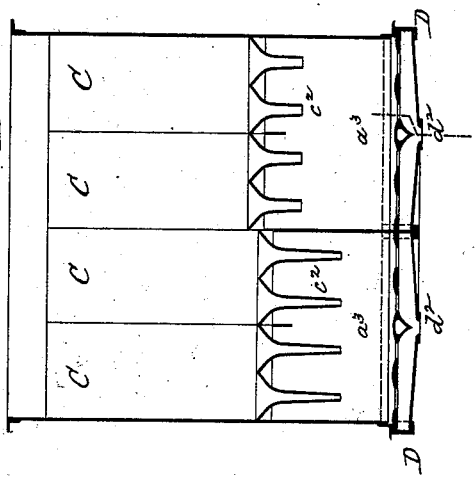
Witnesses:
Inventors:

UNITED STATES PATENT OFFICE.

WILLIAM MACNAB, SR., AND WILLIAM MACNAB, JR., OF FOREST GATE, COUNTY OF ESSEX, ENGLAND; SAID WILLIAM MACNAB, SR., ASSIGNOR TO SAID WILLIAM MACNAB, JR.

APPARATUS FOR SEPARATING BY SUBSIDENCE SOLID MATTERS FROM LIQUIDS, &c.

SPECIFICATION forming part of Letters Patent No. 367,308, dated July 26, 1887.

Application filed April 25, 1887. Serial No. 236,086. (No model.)

*To all whom it may concern:*

Be it known that we, WILLIAM MACNAB, Sr., engineer, and WILLIAM MACNAB Jr., analytical chemist, subjects of the Queen of Great Britain and Ireland, residing at 74 Windsor Road, Forest Gate, in the county of Essex, England, have jointly invented certain new and useful Improvements in Apparatus for Separating by Subsidence Solid Matters from the Liquids in which they are Suspended, of which the following is a specification.

This invention is designed to effect the rapid clarification of liquids holding solid matters in suspension by an efficient and easily-constructed apparatus of but small size compared to the work which it is capable of performing.

It is well known that the rate of subsidence of solids from the liquids in which they are suspended depends on the vertical depth of the layer of liquid through which the solid particles have to fall and on the density and size of these particles, and also, when the turbid liquid is in motion, on the speed of the current. Having regard to these considerations, we construct our apparatus in the following manner, and as illustrated by the example shown in the accompanying drawings, wherein—

Figure 1 is a longitudinal section; Fig. 2, a cross section on the line 1 2 of Fig. 1; and Fig. 3, a transverse section, one half of which shows the inclined plates in the forward part of one of the compartments of the part $A^2$, and the other half showing the plates in the backward part of the same compartment. Fig. 4 shows the plates separately. Fig. 5 is an enlarged detail showing in cross-section the passages below the compartments by which the mud is drawn off.

The apparatus is formed of a horizontal tank, near one end of which there is a vertical transverse partition, $A'$, separating the tank into parts A and $A^2$. In this partition $A'$ there are openings $a\ a$, providing communication between the parts A and $A^2$ of the apparatus. Into the part A the liquid to be treated is introduced. The said part $A'$ has vertical divisions $a'\ a'$, so arranged as to cause the liquid to pass downward, and by the central space and by openings $a^2$ beneath the central partitions upward, and then again downward on its way to the part $A^2$, and thus become thoroughly mixed (and, if necessary, mixed with reagents) before entering the part $A^2$, which constitutes the clarifying portion of the tank. In the said part $A^2$ are fixed inclined flat shelves or plates B B, parallel with each other, and placed at increasing distances apart as they approach the outlet $e$, the first, third, and fifth extending from within a short distance of the top right to the bottom, to which they are also fixed, and the second and fourth from the top to within a certain distance of the bottom, so that a liquid admitted from the first part, A, of the apparatus takes alternately an upward and downward direction in its passage through the part $A^2$ to the point of discharge, and owing to the disposition of these shelves the current becomes gradually slower as it approaches the outlet. In the channels formed by these shelves B B we place a series of movable shelves or plates, C C, parallel to the others, the distance apart of these movable shelves being greatest in the narrowest channel, less in the next, and so on, being at the least distance apart in the widest channel—viz., that nearest the outlet from the part $A^2$. The lower ends of these movable shelves, as well as those of the fixed ones, B, which do not reach the bottom of the part $A^2$, are provided with narrow spouts or chutes $c^2\ c^2$, and the edges of these chutes are turned up, so as to guide and conduct the deposit which takes place on the shelves, and which, owing to their angle of inclination, slides down to the bottom of the tank. The partially-clarified liquid, in its passage from the downward to the upward channels, passes through the spaces between these chutes or spouts without disturbing or being contaminated by the deposit which is falling from the ends of these chutes to the bottom of the tank $A^2$, which is so constructed that the deposited matter can easily be drawn off through outlets terminating in pipes, to which cocks or valves are attached. The outlets, as shown, consist of castings D, fixed to the ends of the plates $a^3\ a^3$ and B, between which is a space for the passage of the mud through openings $d$ into the castings, through which it flows to the outlet at $d^2$, and can thence be drawn off by opening the valve on the pipe secured to the outlet $d^2$.

In this manner we construct an apparatus which presents the most favorable conditions for clarifying turbid liquids by subsidence, for when a liquid containing solid particles in suspension is allowed to stand at rest, or only kept in gentle motion, the greater portion of the solid matter, consisting of the coarser and denser particles, settles out comparatively easily and rapidly, while the finer and lighter particles remain longer in suspension.

In our apparatus the most favorable conditions for subsidence—viz., the slowest current and shallowest layers of water—are found at the end where the lightest and finest particles will also be, and less assistance is given at the beginning, where the bulk of the deposit, composed chiefly of the heavier and coarser particles, takes place.

The rate of flow of the turbid liquid into the apparatus is so adjusted that the effluent liquid is always clear.

It will be evident that we are not limited to the precise number of channels and plates therein as illustrated.

We claim—

1. In apparatus for separating solids from liquids by subsidence, the combination, with the liquid-receptacle, of shelves or partitions, as B, forming a series of channels or passages which increase in size as they approach the outlet end of the receptacle, and a series of plates contained in each of said channels or passages, said plates being nearer together in the channels toward the outlet end of the receptacle than they are in the channels toward the opposite end of the receptacle.

2. The combination, with a mixing-chamber, A, of the receptacle $A^2$, communicating therewith, the shelves B, forming a series of channels or passages in said receptacle gradually increasing in size as they approach the outlet end of the receptacle, and the plates C, contained in said passages or channels and placed nearer together the nearer their channels are to said outlet end, substantially as hereinbefore set forth.

3. The tank or chamber A, provided with partitions whereby the liquid is caused to pass in reverse directions therethrough, in combination with the communicating receptacle $A^2$, provided with partitions or shelves B, forming a series of channels increasing in size toward the outlet end of the receptacle, and plates C, contained in said channels and placed nearer together the nearer their channels are to said outlet end, substantially as and for the purposes hereinbefore set forth.

4. In apparatus for separating solids from liquids, the combination, with the liquid-receptacle provided with a series of communicating channels, from one to the other of which the liquid passes on its way through the receptacle, of plates C, contained in each of said channels and placed nearer together therein the nearer their channels are to the outlet end of the receptacle, substantially as and for the purposes set forth.

5. The combination, with the liquid-receptacle provided with a series of communicating channels or passages, from one to the other of which the liquid passes on its way through the receptacle, of plates C, contained in said channels, provided with spouts or chutes at their lower ends, with spaces between said spouts for the passage of the liquid from one channel to the next, as and for the purposes hereinbefore set forth.

In testimony whereof we have signed our names to this specification in the presence of two subscribing witnesses.

WILLIAM MACNAB, Sr.
WM. MACNAB, Jr.

Witnesses:
CHAS. MILLS,
CHAS. JAS. JONES,
*Both of 47 Lincoln's Inn Fields, London.*